US012686311B2

(12) United States Patent
Zi et al.

(10) Patent No.: US 12,686,311 B2
(45) Date of Patent: Jul. 21, 2026

(54) MOVABLE HEADREST MODULE, SEAT, VEHICLE AND METHOD OF DISASSEMBLING AND ASSEMBLING A SEAT

(71) Applicant: FAURECIA (CHINA) HOLDING CO., LTD., Shanghai (CN)

(72) Inventors: Heng Zi, Shanghai (CN); Xiaochun Deng, Shanghai (CN); Xuanyang Han, Shanghai (CN); Xiaoliang Xu, Shanghai (CN)

(73) Assignee: FAURECIA (CHINA) HOLDING CO., LTD., Shanghai (CN)

( * ) Notice: Subject to any disclaimer, the term of this patent is extended or adjusted under 35 U.S.C. 154(b) by 46 days.

(21) Appl. No.: 18/644,060

(22) Filed: Apr. 23, 2024

(65) Prior Publication Data

US 2024/0351493 A1 Oct. 24, 2024

(30) Foreign Application Priority Data

Apr. 23, 2023 (CN) .......................... 202310443761.3

(51) Int. Cl.
*B60N 2/829* (2018.01)
*B60N 2/02* (2006.01)

(52) U.S. Cl.
CPC ......... *B60N 2/829* (2018.02); *B60N 2/02253* (2023.08)

(58) Field of Classification Search
CPC ........ B60N 2/806; B60N 2/821; B60N 2/809; B60N 2/829; B60N 2/02243
See application file for complete search history.

(56) References Cited

U.S. PATENT DOCUMENTS

2015/0210191 A1* 7/2015 Mizobata ............... B60N 2/812
297/410
2021/0276468 A1* 9/2021 Rehfuss ................... B60N 2/85
2022/0314856 A1* 10/2022 Hildenbrand .......... B60N 2/829

* cited by examiner

*Primary Examiner* — Tye William Abell
(74) *Attorney, Agent, or Firm* — Kilpatrick Townsend & Stockton LLP

(57) ABSTRACT

The present disclosure provides a movable headrest module, a seat, a vehicle and a method of disassembling and assembling a seat. The movable headrest module comprises a first part and a second part, and the second part is able to move relative to the first part, and the second part comprises a moving component supported by the first part and a headrest component connected to the moving component, and the moving component is able to be driven by a driving part to move relative to the first part, and to drive the headrest component to move relative to the first part. The first part has at least a first connecting interface and a second connecting interface, and the first connecting interface and the first part support the moving component through the first connecting interface, and the second connecting interface provides a mounting interface to mount the movable headrest module to a seat frame.

14 Claims, 11 Drawing Sheets

1000

100

6

MOVABLE HEADREST MODULE, SEAT, VEHICLE AND METHOD OF DISASSEMBLING AND ASSEMBLING A SEAT

FIELD

The present disclosure relates to a movable headrest module, a seat, a vehicle and a method of disassembling and assembling a seat.

BACKGROUND

Automobile headrest is a comfort and safety part for driver and passenger, providing support for head and neck. Because everyone has different height and sitting posture, in order to adapt to the needs of different people, the headrest needs to be set to be height-adjustable.

However, the inventor has found that structure of current headrest height-adjustable mechanism generally needs to be integrated into headrest with headrest rod. For headrest without headrest rod, structure of the height-adjustable headrest mechanism is complex, and has many parts, and occupies large space, resulting in a complicated assembly process of the seat and inconvenient disassembly and assembly.

SUMMARY

The present disclosure provides a movable headrest module.

The present disclosure provides a seat.

The present disclosure provides a vehicle.

The present disclosure provides a method of disassembling and assembling a seat.

The present disclosure provides a movable headrest module according to embodiments of the disclosure. The movable headrest module includes a first part and a second part, and the second part is able to move relative to the first part, and the second part includes a moving component supported by the first part and a headrest component connected to the moving component, and the moving component is able to be driven by a driving part to move relative to the first part, and to drive the headrest component to move relative to the first part. The first part has at least a first connecting interface and a second connecting interface, and the first connecting interface and the first part support the moving component through the first connecting interface, and the second connecting interface provides a mounting interface to mount the movable headrest module to a seat frame.

Further, in some embodiments of the present disclosure, the headrest component is located on a first side of the first part, and the mounting interface provided by the second connecting interface makes the seat frame be located on a second side of the first part, and the first side and the second side are separated by the mounting interface.

Further, in some embodiments of the present disclosure, the first part includes a first slide rail configuration and a base, and the first slide rail configuration cooperates with a second slide rail configuration of the moving component, and the base provides the mounting interface.

Further, in some embodiments of the present disclosure, one end of the first slide rail configuration of the first part has a first mounting hole, and a stopper is set at one end of the first slide rail configuration through the first mounting hole.

Further, in some embodiments of the present disclosure, the other end of the first slide rail configuration of the first part has a second mounting hole, and the driving part is set at the other end of the first slide rail configuration through the second mounting hole.

Further, in some embodiments of the present disclosure, the first slide rail configuration includes sliding columns spaced at intervals on the base, and located on a first side of the base, and the base has a third mounting hole corresponding to an area between adjacent sliding columns, to provide a mounting position to mount the movable headrest module to the seat frame; and the moving component includes a sliding groove to cooperate with the sliding column, and a base body connecting adjacent sliding grooves, and the base body provides a third connecting interface, to connect the driving part.

Further, in some embodiments of the present disclosure, the third connecting interface of the base body includes a connecting hole penetrating the base body; and the driving part includes a screw motor, and a screw rod outputting the driving penetrates the connecting hole and cooperates with it.

Further, in some embodiments of the present disclosure, the base body further includes a fourth connecting interface, connecting with the sliding grooves located on both sides, and the fourth connecting interface is configured to connect the headrest component.

Further, in some embodiments of the present disclosure, headrest component includes a headrest bracket, and the headrest bracket includes a connecting body and a first connecting portion and a second connecting portion respectively located at both ends of the connecting body; and the first connecting portion is connected to the fourth connecting interface, and the second connecting portion is configured to connect the headrest.

Further, in some embodiments of the present disclosure, the first slide rail configuration of the first part is integrated with the base, and the moving component is an integrated component.

In addition, the present disclosure provides a seat according to embodiments of the disclosure, and the seat includes the movable headrest module according to the above-mentioned embodiments of the disclosure, and a seat frame, and the movable headrest module is mounted to the seat frame through the mounting interface.

Further, in some embodiments of the present disclosure, the seat frame includes a body frame and a headrest frame connected to a top part of the body frame, and the headrest frame includes a supporting plate portion, and the supporting plate portion extends along a moving direction in which the second part moves relative to the first part.

In addition, the present disclosure provides a vehicle according to embodiments of the disclosure, and the vehicle includes a seat, and at least one seat is the seat according to according to the above-mentioned embodiments of the disclosure.

In addition, the present disclosure provides a method of disassembling and assembling a seat according to embodiments of the disclosure, and seat includes the movable headrest module according to the above-mentioned embodiments of the disclosure, and a seat frame, and the movable headrest module is mounted to the seat frame through the mounting interface, and the method of disassembly and assembly includes following step: when a connecting member set on the mounting interface is detached or mounted to the seat frame, the movable headrest module as a whole is detached or mounted to the seat frame.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

REFERENCE NUMERALS

Figure 1:
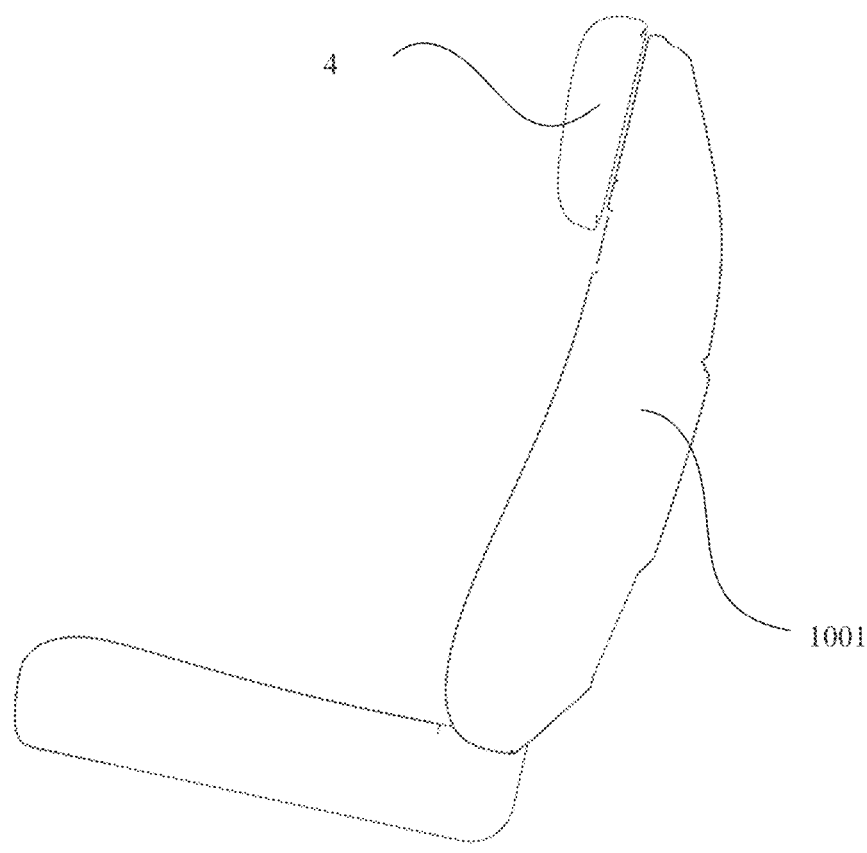
FIG. 1 is a schematic structural diagram of a seat provided in accordance with some embodiments of the present disclosure.
Figure 2A:
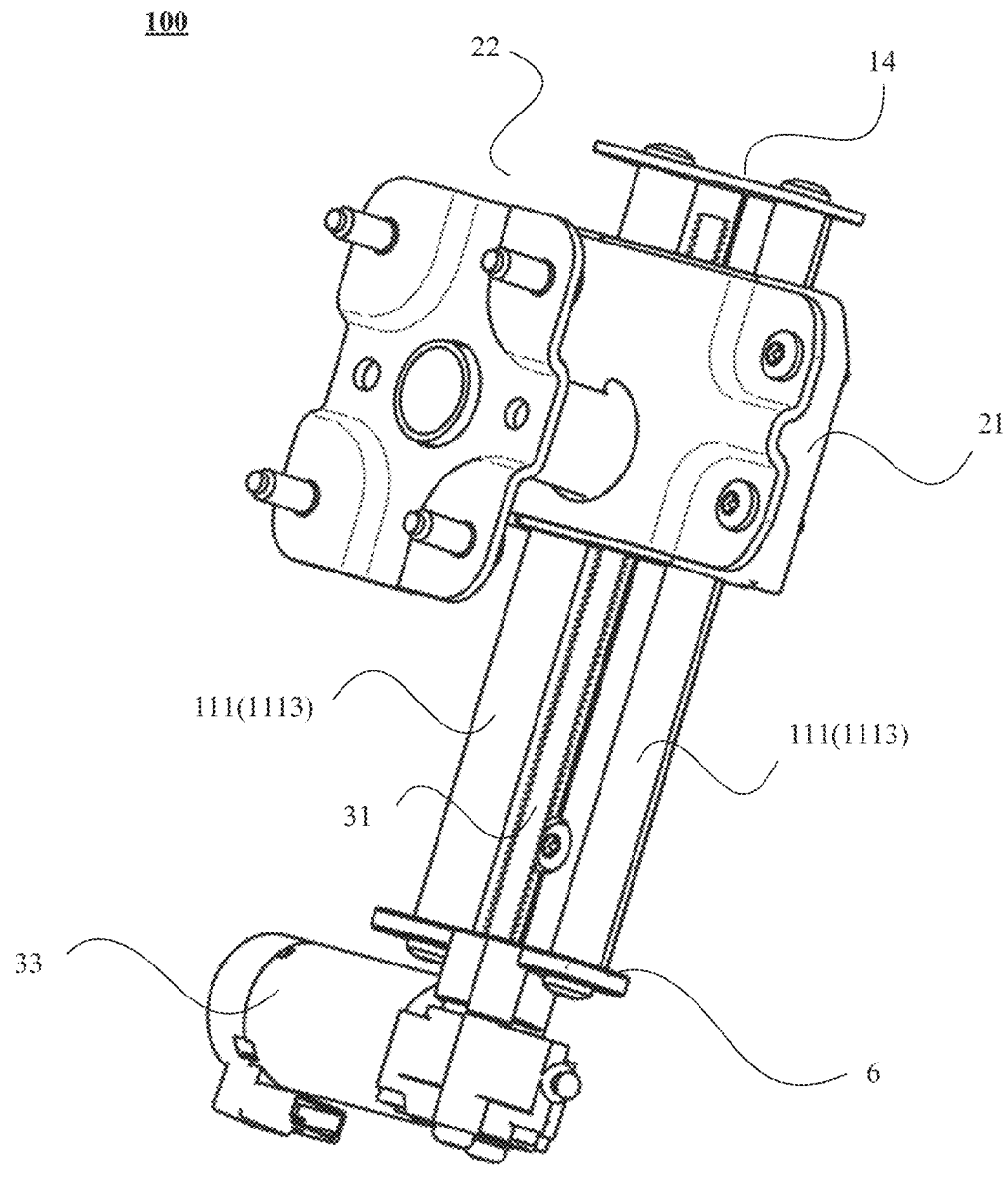
FIGS. 2A to 2D are structural diagrams of different views of a movable headrest module in accordance with some embodiments of the present disclosure.
Figure 2B:
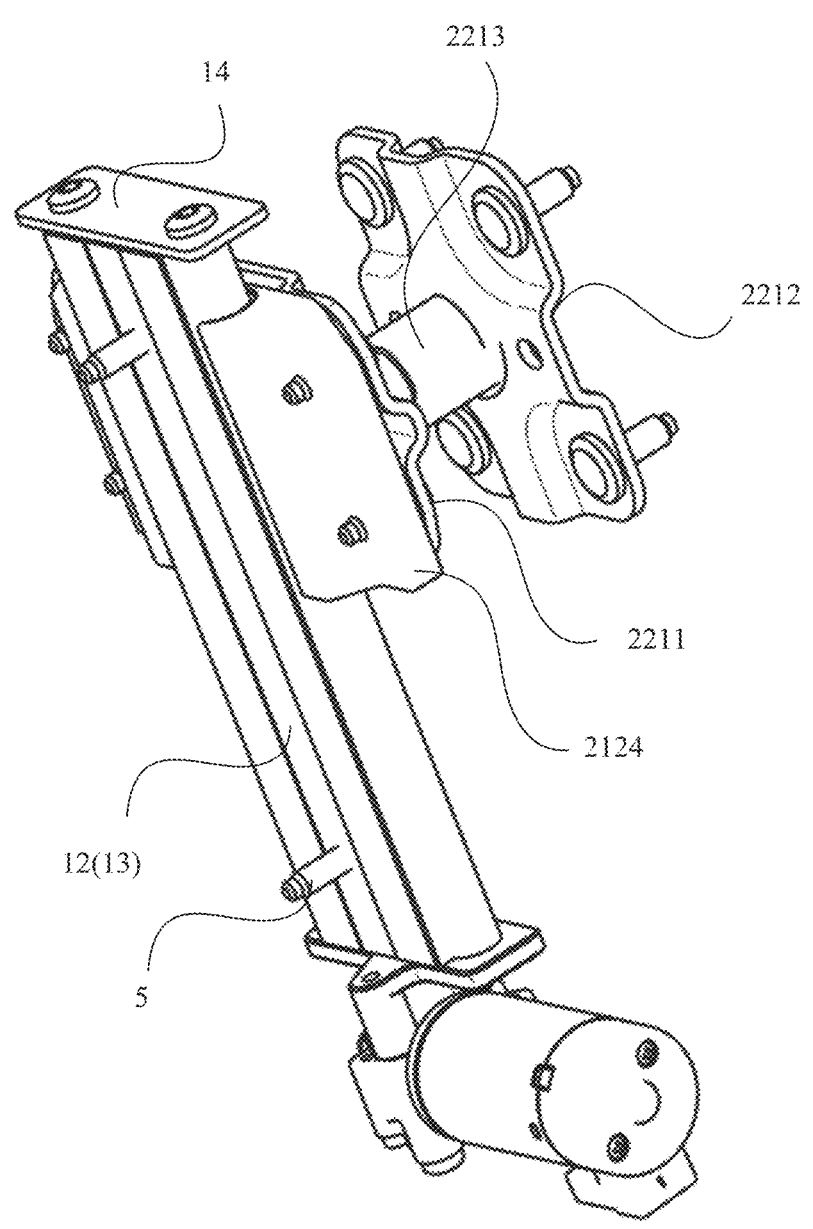
Figure 2C:
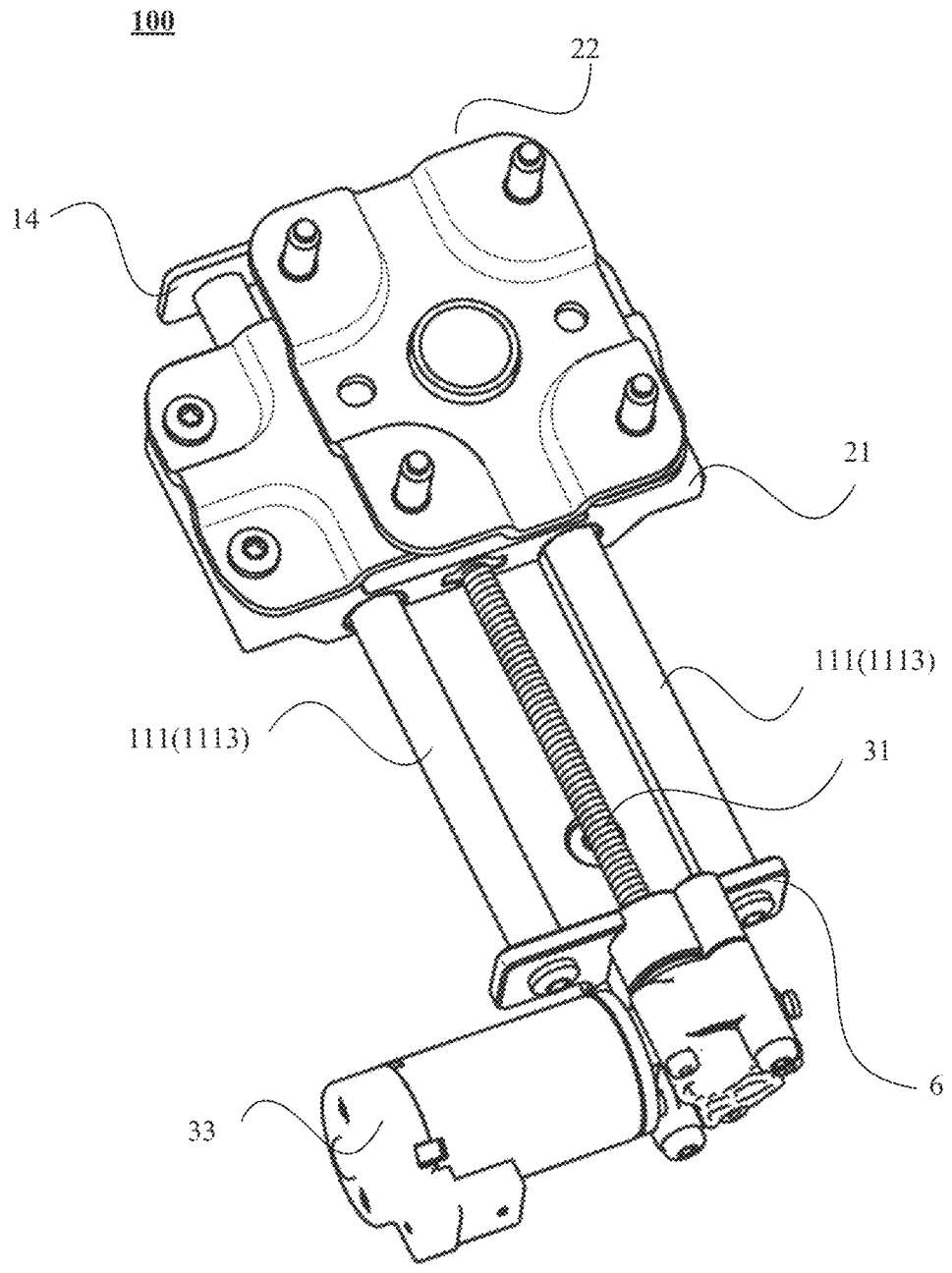
Figure 2D:
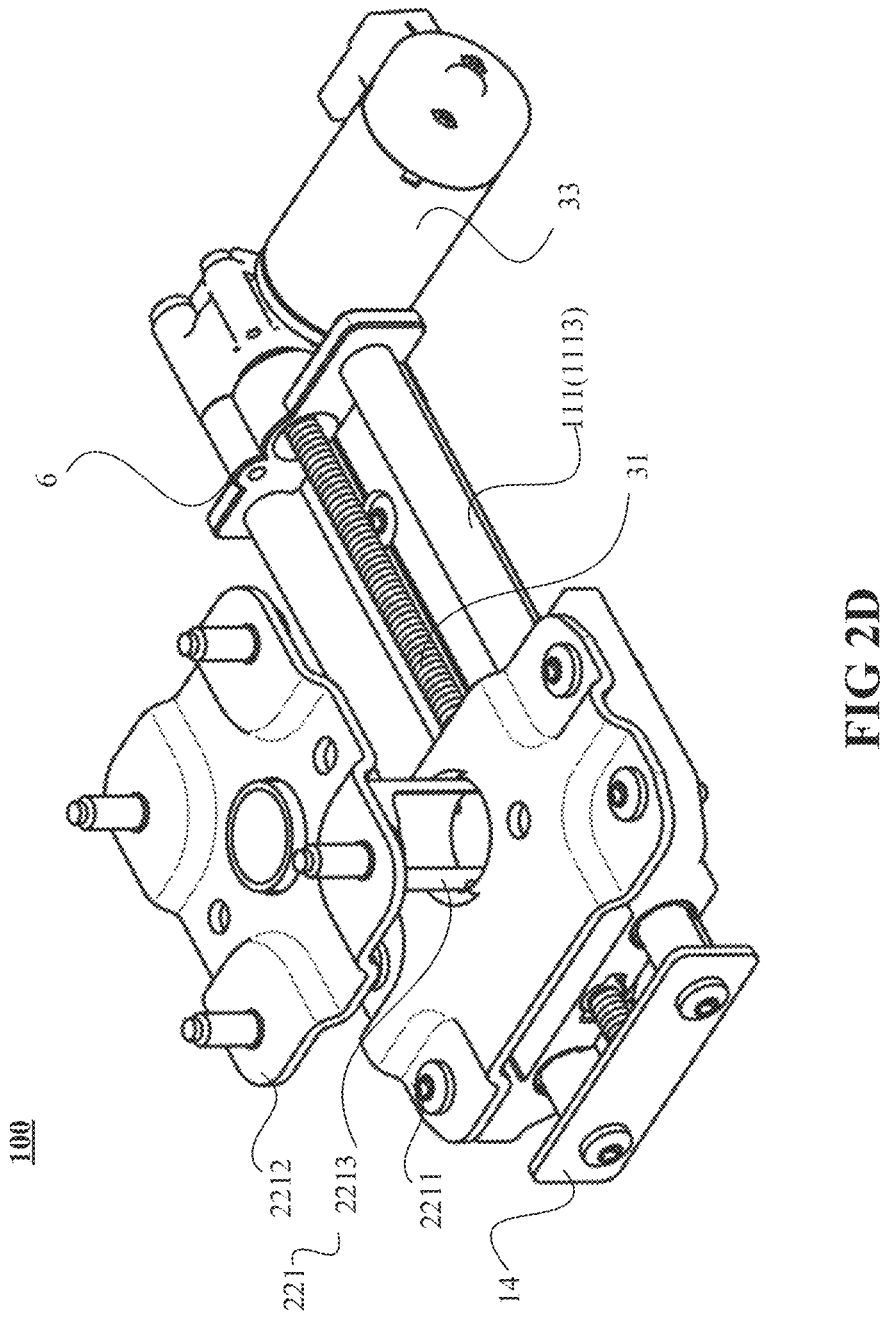

1000—Seat
1001—Backrest
100—Movable headrest module
1—First part
11—First connecting interface
12—Second connecting interface
13—Mounting interface
131—Connecting member
111—First slide rail configuration
1111—First mounting hole
1112—Second mounting hole
1113—Sliding column
14—Stopper
112—Base
1121—Third mounting hole
2—Second part
21—Moving component
211—Second slide rail configuration
2111—Sliding groove
2112—Sleeve
212—Base body
2122—Third connecting interface
2123—Connecting hole
2124—Fourth connecting interface
22—Headrest component
221—Headrest bracket
2213—Connecting body
2211—First connecting portion
2212—Second connecting portion
3—Driving part
30—Screw motor
31—Screw rod
32—Driving nut
33—Motor
4—Headrest
5—Bolt
6—Bracket
61—First hole
62—Second hole
200—Seat frame
201—Body frame 202—Headrest frame
2021—Supporting plate portion
2001—Mounting hole
2002—Nut.

DETAILED DESCRIPTION OF EMBODIMENTS

The implementations of the present disclosure are described below by specific embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure.

In addition, the words "up", "down", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It should be noted that in the following description, for example, "one embodiment", "an embodiment", and/or "some embodiments" refer to a feature, structure or characteristic related to at least one embodiment of the present disclosure. Therefore, it should be emphasized and noted that "an embodiment" or "one embodiment" or "one or more embodiments" mentioned twice or more in different positions in this specification do not necessarily refer to the same embodiment. In addition, some features, structures or characteristics in one or more embodiments of the present disclosure may be appropriately combined.

For seats, such as automobile seats, because passengers have different height and sitting posture, in order to adapt to the needs of different passengers, headrest needs to be set to be height-adjustable. The inventor of the present disclosure found that the structure of the current seat headrest height-adjustable mechanism generally needs to be integrated into the headrest rod type headrest. However, for non-headrest rod-type headrest structures, height-adjustable movable headrest modules generally have a complex structure, many parts, and occupy a large space, resulting in a complicated assembly process of the seat and inconvenient disassembly and assembly.

The inventor has found that structure of current headrest height-adjustable mechanism generally needs to be integrated into headrest with headrest rod. For headrest without headrest rod, structure of the height-adjustable headrest mechanism is complex, and has many parts, and occupies large space, resulting in a complicated assembly process of the seat and inconvenient disassembly and assembly.

After in-depth research, the inventors of the present disclosure provide a movable headrest module to solve the above problems. By setting a first connecting interface on a first part, and a second connecting interface on a second part, to support a moving component and to provide a mounting interface for the headrest to be mounted on a seat frame, to make the structure of the movable headrest module simple while movable, and have fewer parts, to simplify the disassembly and assembly process of the seat, to facilitate assembly and maintenance work.

The movable headrest module introduced in the following embodiments is suitable for height adjustment of a headrest without headrest rod type on the top of the automobile seat to obtain effects of compact structure, easy disassembly and maintenance, but not limited to this, for example, moving direction is not limited to the height direction, and the headrest module can be arranged at other positions than the top of the automobile seat, and for example, it can be applied to other kinds of vehicle, such as engineering machinery, railway trains, ships, airplanes, etc. In addition, application scenes of the seat are not limited to vehicle. For example, it can also be applied to fixed places, such as conference venues, auditoriums, cinemas, etc., as long as the seats can be applied with the movable headrest module disclosed in the embodiments of the present disclosure.

Figure 5:
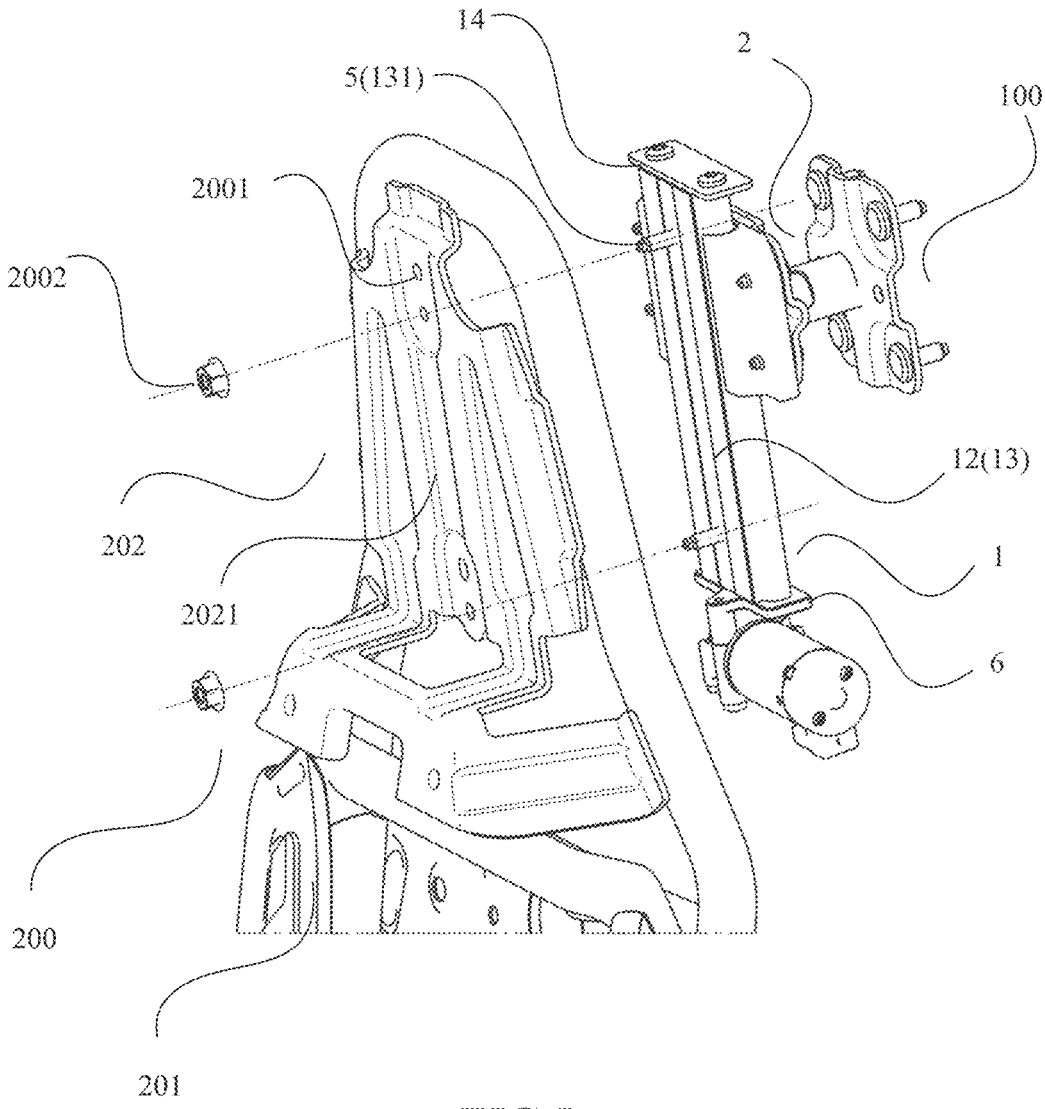
FIG. 5 is a schematic diagram of a connecting structure between a movable headrest module and a seat frame in accordance with some embodiments of the present disclosure.

As shown in FIG. 1, the vehicle provided according to an embodiment of the present disclosure includes a seat 1000. The seat 1000 includes a backrest 1001 and a headrest 4. The headrest 4 is located on the top of the backrest 1001. The headrest 4 is height-adjustable and is able to provide support for the user's head during rest, preventing the head from shaking, and improve the comfort and convenience of use. The seat 1000 includes a movable headrest module 100 inside and a seat frame 200. As shown in FIG. 5, the movable headrest module 100 is mounted to the seat frame 200 through a mounting interface 13. It can be understood that the seat frame 200 shown in FIG. 5 is a partial structure, and the seat frame 200 normally includes a body frame 201 and a headrest frame 202 connected to the top of the body frame 201. In FIG. 5, most of the body frame 201 is omitted, and the body frame 201 corresponds to the seat frame of the backrest 1001. The headrest frame 202 includes a supporting plate portion 2021 extending along a height direction, that is, extending along a moving direction of the headrest 4 provided by the movable headrest module 100, to make the seat frame provide a stable mounting and support to the movable headrest module 100.

As shown in FIGS. 2A to 5, in some embodiments, the movable headrest module 100 includes a first part 1 and a second part 2. The second part 2 is able to move relative to the first part 1, and the second part 2 includes a moving component 21 supported by the first part 1 and a headrest component 22 connected to the moving component 21, and the moving component 21 is able to be driven by a driving part 3 to move relative to the first part 1, and to drive the headrest component 22 to move relative to the first part 1. The first part 1 has at least a first connecting interface 11 and a second connecting interface 12, and the first connecting interface 11 and the first part 1 support the moving component 21 through the first connecting interface 11, and the second connecting interface 12 provides a mounting interface 13 to mount the movable headrest module 100 to a seat frame 200.

The first part 1 is normally a fixed part, while the second part 2 is a movable part. By a movement of the second part 2 relative to the first part 1, the headrest 4 connected to the second part 2 is height adjustable to the seat.

Here, the second part 2 and the headrest 4 are provided separately and connected through connecting member, but not limited to this, for example, they may also be connected in other forms, such as being integrally connected.

The supporting structure of the first connecting interface 11 and the moving component 21 can be that the moving component 21 directly contacts the first connecting interface 11, and the structure of the second connecting interface 12 providing the mounting interface 13, as shown in FIG. 5, can be that the second connecting interface 12 is a flat surface, providing mounting holes, such as screw holes, and the movable headrest module 100 and the seat frame are directly connected by screw through the second connecting interface 12 of the first part 1. It can be understood that the connecting interface is not limited to a flat surface, for example, the structure of the first connecting interface is not a flat surface.

The beneficial effect of the above described embodiment is that, by setting the first connecting interface 11 on the first part 1, and the second connecting interface 12 on the second part 2, and the first part 1 is able to support the moving component 21, and at the same time provide the mounting interface for the headrest to be mounted on the seat frame 200, to make the structure of the movable headrest module simple while movable, and have fewer parts, to simplify the disassembly and assembly process of the seat, to facilitate assembly and maintenance work.

As shown in FIGS. 2A to 2D, and FIGS. 3 and 5, in some embodiments, the headrest component 22 is located on a first side of the first part 1, and the mounting interface 13 provided by the second connecting interface 12 makes the be located on a second side of the first part 1, and the first side and the second side are separated by the mounting interface 13.

The first side and the second side, for example, as shown in FIG. 5, the first side is the side away from the seat frame 200, that is, the side facing the user when the seat is in use, that is, a front side, oppositely, the second side is a back side.

The beneficial effect of the above described embodiment is that, the seat frame and the corresponding headrest are located in an area being at approximately the same height in the seat, to make the structure of the movable seat module and the seat more compact.

As shown in FIGS. 3, 4A, 4B, 4F and 5, in some embodiments, detailed structure of the first part 1 can be that the first part 1 includes a first slide rail configuration 111 and a base 112, and the first slide rail configuration 111 cooperates with a second slide rail configuration 211 of the moving component 21, and the base 112 provides the mounting interface 13. Such structure of the first part 1 is simple, by a simple groove-shaped structure, the first part 1 integrates the functions of supporting the moving component 21 and providing the mounting interface 13, and is easy to manufacture and assemble. The first slide rail configuration 111 and the base 112 can form a groove-shaped structure as shown in the Figs, and opening direction of the groove is toward the above-mentioned first side. This structure can be easily formed an integrated structure in which the first slide rail configuration 111 and the base 112 are integrally connected, and the first part 1 can be formed by a simple stamping process, and the manufacturing cost is low. At the same time, the material of the first part 1 normally metal that is easy to stamp and has good strength, such as aluminum alloy material, but not limited to this. For example, the material of the first part 1 can also be an engineering plastic with good strength, such as PA66 plastic material mixed with 30% glass fiber (PA66 GF30) material, the corresponding manufacturing process can be injection molding.

Detailed structure of the base 112 can be a flat structure as shown in the Figs, to be simpler and easier to form, but not limited to this. The base 112 normally needs to be similar in shape to the connecting area of the corresponding headrest frame 202, and if the shape of the connecting area of the headrest frame 202 is a curved surface, and the shape of the base 112 can also be a curved surface correspondingly. The structure that the base 112 provides the mounting interface 13, for example, can be that the base 112 has a third mounting hole 1121 to provide a bolt 5 to pass through, to be correspondingly connected to the mounting hole 2001 and nut 2002 for mounting the movable headrest module

100 to the seat frame 200. The structure employing the third mounting hole 1121 is easy to manufacture, for example, it can be formed at the same time during stamping processing.

Figure 3:
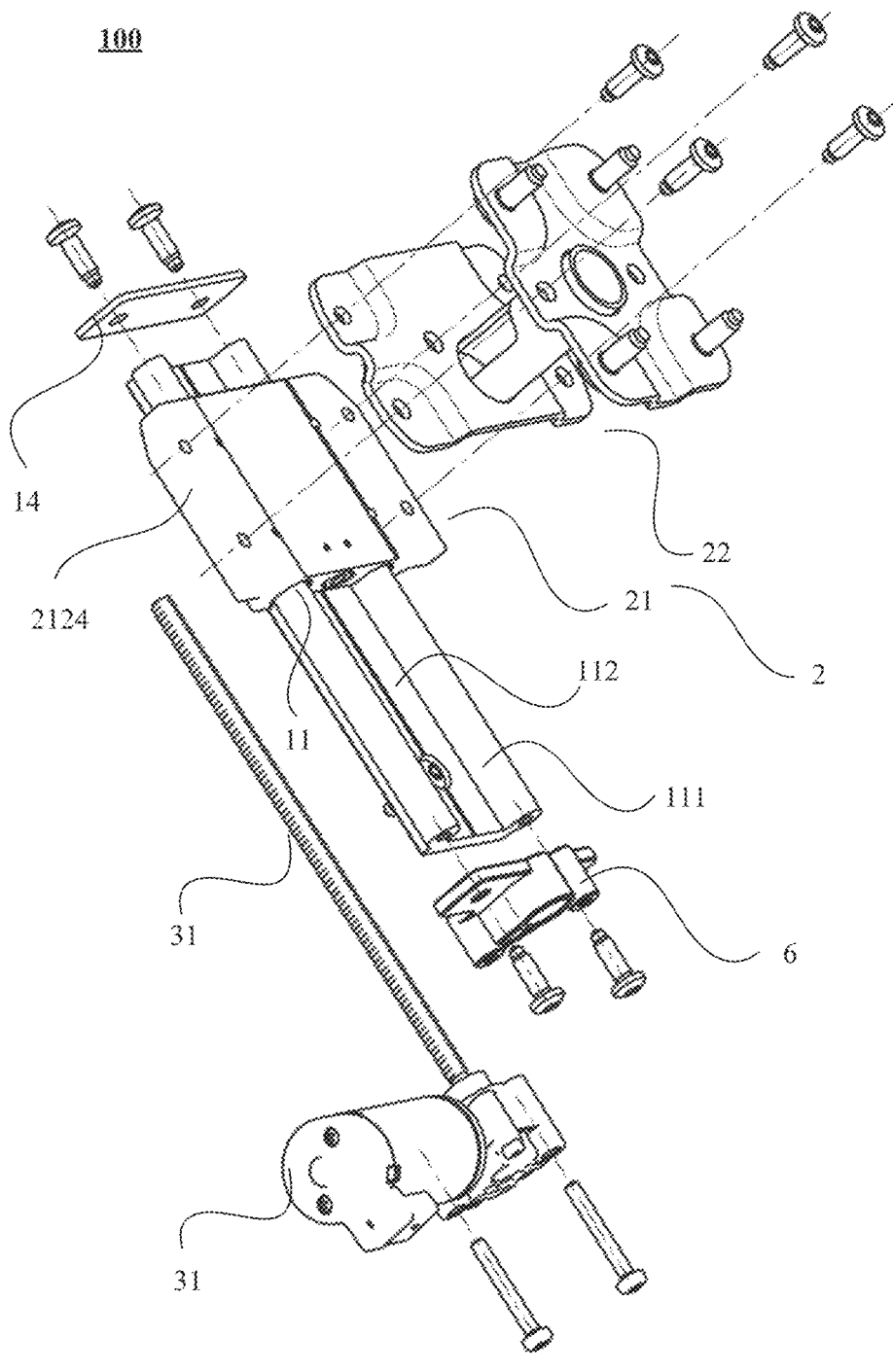
FIG. 3 is an exploded view structural diagram of a movable headrest module in accordance with some embodiments of the present disclosure.
Figure 4A:
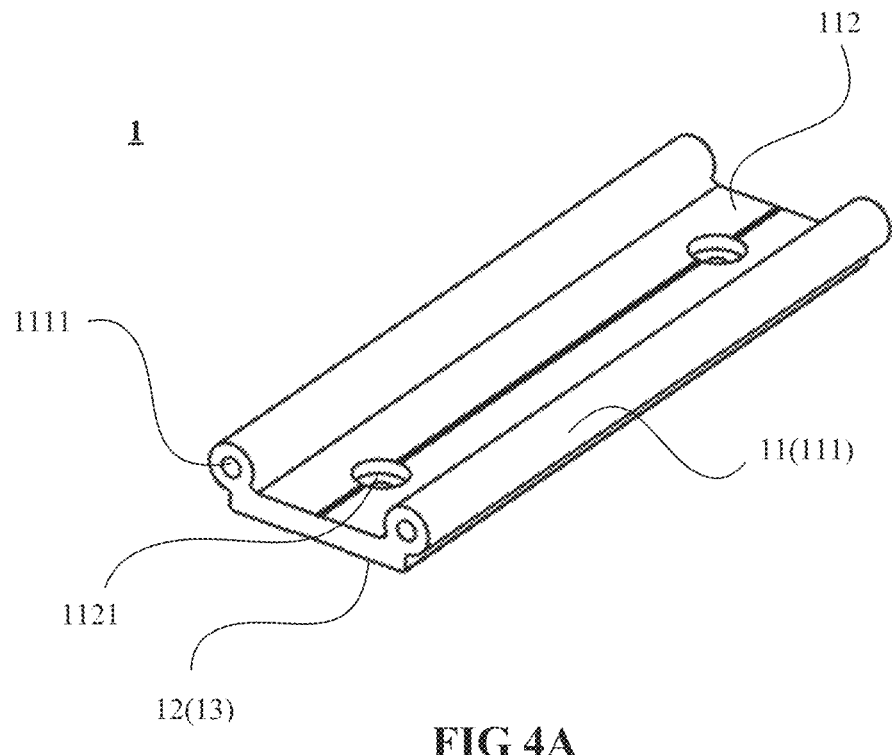
FIGS. 4A to 4G are partial structural diagrams of a movable headrest module in accordance with some embodiments of the present disclosure.
Figure 4B:
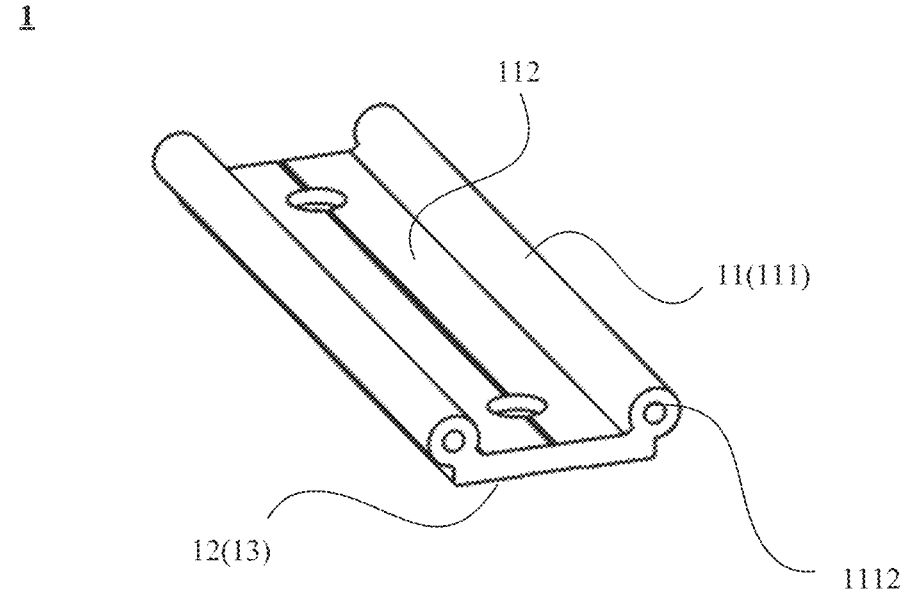
Figure 4C:
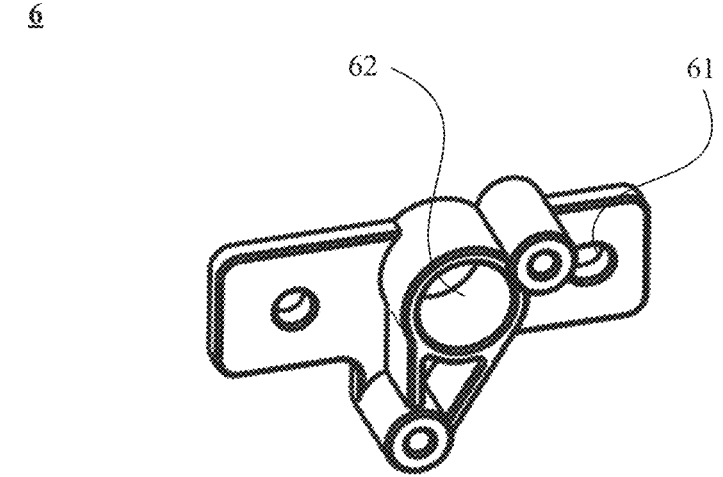
Figure 4D:
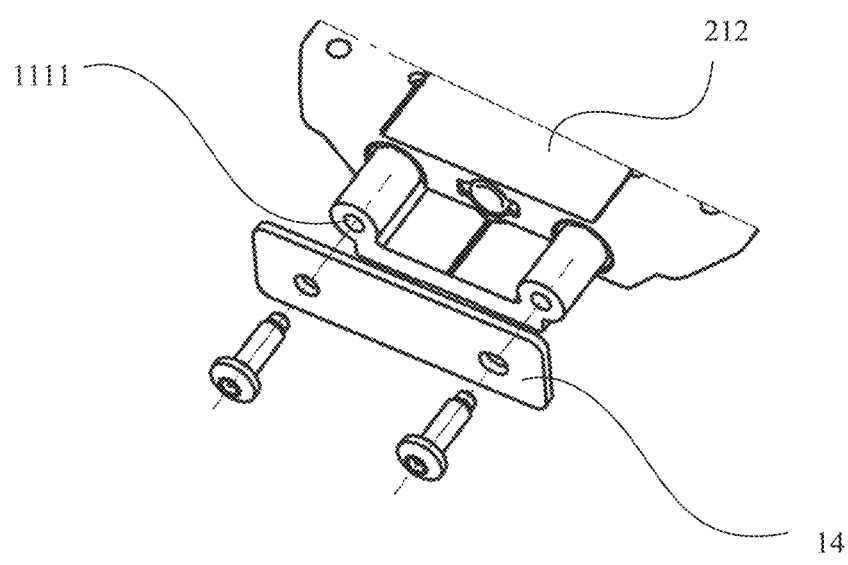
Figure 4E:
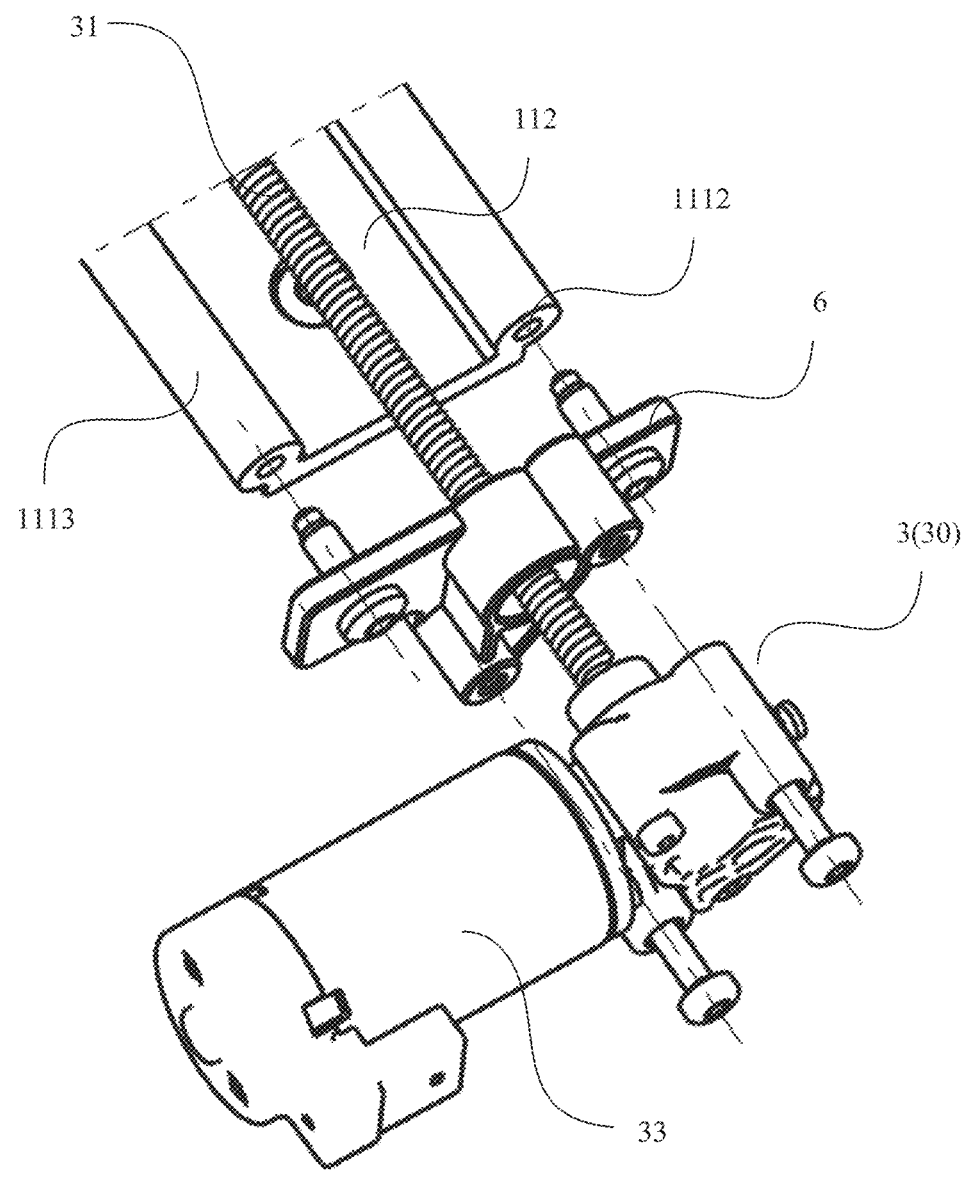

As shown in FIGS. 3, 4D, and 5, in some embodiments, detailed structure of the first part 1 can be that one end of the first slide rail configuration 111 of the first part 1 has a first mounting hole 1111, and a stopper 14 is set at one end of the first slide rail configuration 111 through the first mounting hole 1111, to provide a simple and easy to assemble structure in which the second part 2 moves relative to the first part 1. Continuing to refer to FIGS. 3, 4C, 4E and 5, in some embodiments, the other end of the first slide rail configuration 111 of the first part 1 has a second mounting hole 1112, and the driving part 3 is set at the other end of the first slide rail configuration 111 through the second mounting hole 1112, and a mounting bracket 6 of the driving part 3 shown in FIG. 4C has a first hole 61 corresponding to the second mounting hole 1112 and a second hole 62 for a corresponding driving member to pass through. The beneficial effect of the above embodiment is that, in addition to integrating functions of supporting the moving component 21 and providing the mounting interface 13, the first part 1 further integrates functions of the mounting a stopper 14 and the mounting bracket 6 of the driving part 3, and structure of the movable headrest module 100 is further compact.

Figure 4F:
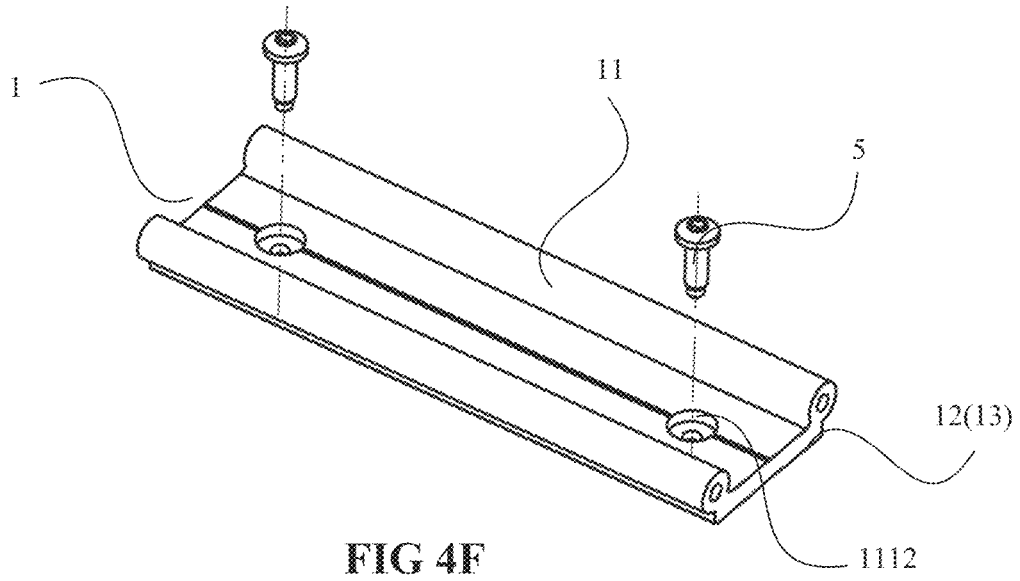
Figure 4G:
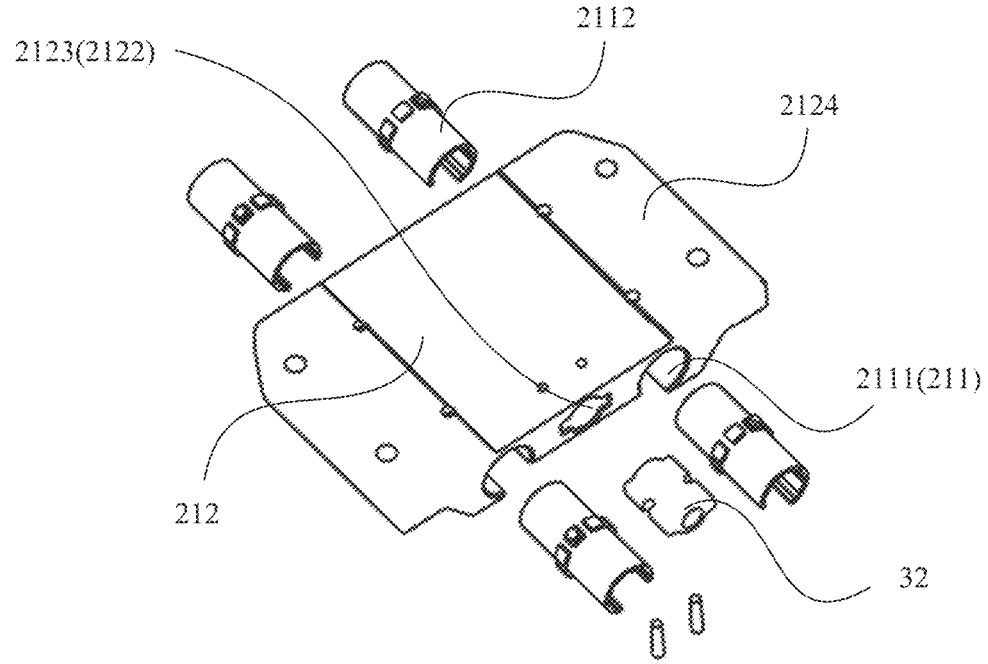

Continuing to refer to FIGS. 3 to 5, in some embodiments, detailed structure of the first part 1 and the moving component 21 can be that, the first slide rail configuration 111 includes sliding columns 1113 spaced at intervals on the base 112, and located on a first side of the base 112, and the base 112 has a third mounting hole 1121 corresponding to an area between adjacent sliding columns 1113, to provide a mounting position to mount the movable headrest module 100 to the seat frame 200, for example, as shown in FIGS. 4F and 5, the third mounting hole 1121 make the bolt 5 pass through to correspondingly connect to the mounting hole 2001 and nut 2002 connecting the movable headrest module 100 to the seat frame 200. The moving component 21 includes a sliding groove 2111 to cooperate with the sliding column 1113, and a base body 212 connecting adjacent sliding grooves 2111. The structure of the sliding groove 2111 and the sliding column 1113 can be that the sliding groove 2111 at least partially surrounds the sliding column 1113, as shown in FIG. 4G, and a sleeve 2112 can be set between the sliding groove 2111 and the sliding column 1113, to further optimize the smoothness of movement therebetween, and reduce the use of lubricating oil and maintenance times, improve the service life of the module. In some embodiments, the sleeve 2112 can be made of self-lubricating materials, such as polytetrafluoroethylene, polyacetal, polyformaldehyde, polycarbonate, polyamide, polysulfone, polyimide, chlorinated polyether, polyphenylene sulfide, and polyterephthalate, etc., and can also be made of fiber materials such as ring glass fiber, metal fiber, graphite fiber, boron fiber, etc. The base body 212 provides a third connecting interface 2122, to connect the driving part 3. In some embodiments, as shown in FIGS. 3 and 5, the driving part 3 includes a screw motor 30, and he third connecting interface 2122 of the base body 212 has a connecting hole 2123 penetrating the base body 212, and the specific penetrating direction can be the moving direction in which the second part 2 moves relative to the first part 1. A screw rod 31 driven by the screw motor 30 penetrates the connecting hole 2123 and cooperates with it. Detailed structure of the screw motor 30 can be that employing the screw rod 31 as an output shaft, while a driving nut 32 corresponding to the screw rod 31, as shown in FIG. 4G, can be integrated and mounted to the connection hole 2123 of the base body 212, and a motor 33 of the screw motor 30 can be correspondingly mounted in the mounting space provided by the bracket 6, and the movable headrest module 100 has a higher integration level and a more compact structure. It can be understood that structure of the driving part 3 is not limited to the screw motor shown in the Figs, for example, it can also be a linear motor, as long as it can drive the moving component 21 to move.

Continuing to refer to FIGS. 3 to 5, in some embodiments, detailed structure of the moving component 21 can also be that, the base body 212 further includes a fourth connecting interface 2124, connecting with the sliding grooves 2111 located on both sides, and the fourth connecting interface 2124 is configured to connect the headrest component 22, and the moving component 21 is able to stably support the headrest component 22. In some embodiments, as shown in FIGS. 2A to 2D, and 3, structure of the headrest component can be that, the headrest component 22 includes a headrest bracket 221, and the headrest bracket 221 includes a connecting body 2213 and a first connecting portion 2211 and a second connecting portion 2212 respectively located at both ends of the connecting body 2213; and the first connecting portion 2211 is connected to the fourth connecting interface 2124, and the second connecting portion 2212 is configured to connect the headrest 4, and the headrest is able to be mounted to the movable headrest module 100 more steadily. Similar to the first part 1, the moving component 21 can also be an integrated component, that is, the second slide rail configuration 211 and the base body 212 introduced above are integrally connected. For example, they can be integrally formed by forging or casting. In this case, material of the moving component 21 is normally a metal material that is easy to forge or cast and has good strength, such as aluminum alloy material, but not limited to this. For example, the moving component 21 can also be made of an engineering plastic with good strength, such as PA66 plastic material mixed with 30% glass fiber (PA66 GF30) material, the corresponding manufacturing process can be injection molding. The integrated structure of the first part 1 and the moving component 21 is able to reduce the number of parts, to make the assembly process easier while to ensure connection reliability.

Based on the above, in some embodiments, the present disclosure also provides a method of disassembling and assembling a seat. The seat is the seat 1000 including the movable headrest module 100 introduced in the above embodiments. The method of disassembling and assembling method includes: when a connecting member 131 set on the mounting interface 13 is detached or mounted to the seat frame 200, the movable headrest module 100 as a whole is detached or mounted to the seat frame 200.

As shown in FIG. 5, when the movable headrest module 100 is detached to the seat 1000, the connecting member 131 (such as a bolt 5) corresponding to the third mounting hole 1121 is detached, and at this time, the first part 1 and the second part 2 are able to be detached as a whole, and the disassembling is easy. The assembling is the same, it is only necessary to assemble the first part 1 and the second part 2 and mount them to the seat frame 200, and there is no need to further mount them to another structural components to mount them to the seat frame 200. It can be understood that, the beneficial effect is that the disassembly and assembly processes are simple, being easy to do the assembly and maintenance work.

Although the above embodiments of the present disclosure are disclosed as above, they are not used to limit the present disclosure. Therefore, any amendments, equivalent changes and modifications made to the above embodiments according to the essence of the present disclosure without departing from the proposal of the present disclosure fall within the scope of protection defined in the claims of the present disclosure.

The invention claimed is:

1. A movable headrest module, comprising:
a first part; and
a second part, and the second part being able to move relative to the first part, and the second part comprising a moving component supported by the first part and a headrest component connected to the moving component, wherein the moving component is able to be driven by a driving part to move relative to the first part, and to drive the headrest component to move relative to the first part;
wherein, the first part has at least a first connecting interface and a second connecting interface, and the first connecting interface and the first part support the moving component through the first connecting interface, and the second connecting interface provides a mounting interface to mount the movable headrest module to a seat frame;
wherein, when a connecting member set on the mounting interface is detached from the seat frame, the movable headrest module as a whole is detached from the seat frame.

2. The movable headrest module according to claim 1, wherein the headrest component is located on a first side of the first part, and the mounting interface provided by the second connecting interface makes the seat frame be located on a second side of the first part, and the first side and the second side are opposite to each other relative to the mounting interface.

3. The movable headrest module according to claim 1, wherein the first part comprises a first slide rail configuration and a base, and the first slide rail configuration cooperates with a second slide rail configuration of the moving component, and the base provides the mounting interface.

4. The movable headrest module according to claim 3, wherein the first slide rail configuration of the first part is integrated with the base, and the moving component is an integrated component.

5. The movable headrest module according to claim 3, wherein one end of the first slide rail configuration of the first part has a first mounting hole, and a stopper is set at one end of the first slide rail configuration through the first mounting hole.

6. The movable headrest module according to claim 5, wherein the other end of the first slide rail configuration of the first part has a second mounting hole, and the driving part is set at the other end of the first slide rail configuration through the second mounting hole.

7. The movable headrest module according to claim 3, wherein the first slide rail configuration comprises a plurality of sliding columns spaced at intervals on the base, and located on a first side of the base, and the base has a third mounting hole corresponding to an area between adjacent sliding columns, to provide a mounting position to mount the movable headrest module to the seat frame; and the moving component comprises a sliding groove to cooperate with the sliding column, and a base body connecting adjacent sliding grooves, wherein the base body provides a third connecting interface, to connect the driving part.

8. The movable headrest module according to claim 7, wherein the third connecting interface of the base body comprises a connecting hole penetrating the base body; and the driving part comprises a screw motor, and a screw rod outputting rotation penetrates the connecting hole and cooperates with the connecting hole.

9. The movable headrest module according to claim 7, wherein the base body further comprises a fourth connecting interface, connecting with the sliding grooves located on both sides, and the fourth connecting interface is configured to connect the headrest component.

10. The movable headrest module according to claim 9, wherein the headrest component comprises a headrest bracket, and the headrest bracket comprises a connecting body and a first connecting portion and a second connecting portion respectively located at both ends of the connecting body; and the first connecting portion is connected to the fourth connecting interface, and the second connecting portion is configured to connect a headrest.

11. A seat, comprising:
a movable headrest module, comprising:
a first part; and
a second part, and the second part being able to move relative to the first part, and the second part comprising a moving component supported by the first part and a headrest component connected to the moving component, wherein the moving component is able to be driven by a driving part to move relative to the first part, and to drive the headrest component to move relative to the first part;
wherein, the first part has at least a first connecting interface and a second connecting interface, and the first connecting interface and the first part support the moving component through the first connecting interface, and the second connecting interface provides a mounting interface to mount the movable headrest module to a seat frame; and
the seat frame;
wherein the movable headrest module is mounted to the seat frame through the mounting interface;
wherein, when a connecting member set on the mounting interface is detached from the seat frame, the movable headrest module as a whole is detached from the seat frame.

12. The seat according to claim 11, wherein the seat frame comprises a body frame and a headrest frame connected to a top part of the body frame, wherein the headrest frame comprises a supporting plate portion, and the supporting plate portion extends along a moving direction in which the second part moves relative to the first part.

13. A vehicle, comprising a seat, wherein at least one seat comprises:
a movable headrest module, comprising:
a first part; and
a second part, and the second part being able to move relative to the first part, and the second part comprising a moving component supported by the first part and a headrest component connected to the moving component, wherein the moving component is able to be driven by a driving part to move relative to the first part, and to drive the headrest component to move relative to the first part;
wherein, the first part has at least a first connecting interface and a second connecting interface, and the first connecting interface and the first part support the moving component through the first connecting interface, and the second connecting interface provides a mounting interface to mount the movable headrest module to a seat frame; and the seat frame;

wherein the movable headrest module is mounted to the seat frame through the mounting interface;

wherein, when a connecting member set on the mounting interface is detached from the seat frame, the movable headrest module as a whole is detached from the seat frame.

14. A method of disassembling and assembling a seat, the seat comprising a movable headrest module comprising: a first part; and a second part, and the second part being able to move relative to the first part, and the second part comprising a moving component supported by the first part and a headrest component connected to the moving component, wherein the moving component is able to be driven by a driving part to move relative to the first part, and to drive the headrest component to move relative to the first part; wherein, the first part has at least a first connecting interface and a second connecting interface, and the first connecting interface and the first part support the moving component through the first connecting interface, and the second connecting interface provides a mounting interface to mount the movable headrest module to a seat frame; and the seat frame, and the movable headrest module is mounted to the seat frame through the mounting interface, wherein the method of disassembly and assembly comprises following step:

when a connecting member set on the mounting interface is detached from the seat frame, the movable headrest module as a whole is detached from the seat frame.

* * * * *